United States Patent [19]

Littlejohn

[11] Patent Number: 5,648,708

[45] Date of Patent: Jul. 15, 1997

[54] FORCE ACTUATED MACHINE CONTROLLER

[75] Inventor: Douglas J. Littlejohn, Squaw Valley, Calif.

[73] Assignee: Power Concepts, Inc., Fresno, Calif.

[21] Appl. No.: 444,458

[22] Filed: May 19, 1995

[51] Int. Cl.[6] .................................. G01L 5/16; A61G 5/04
[52] U.S. Cl. ..................... 318/488; 318/139; 73/862.042; 73/862.045; 180/907
[58] Field of Search ........................ 318/139, 481, 318/488, 489, 646, 648; 73/862.044, 862.042, 862.045; 74/471 XY; 180/907

[56] References Cited

U.S. PATENT DOCUMENTS

| | | |
|---|---|---|
| 3,814,199 | 6/1974 | Jones . |
| 3,948,093 | 4/1976 | Folchi et al. . |
| 4,044,642 | 8/1977 | Pearlman et al. ........................ 84/1.1 |
| 4,246,452 | 1/1981 | Chandler ................................ 200/5 A |
| 4,313,113 | 1/1982 | Thornburg .............................. 340/709 |
| 4,323,829 | 4/1982 | Witney et al. .......................... 318/55 |
| 4,493,219 | 1/1985 | Sharp et al. ........................... 73/862.05 |
| 4,536,746 | 8/1985 | Gobeli . |
| 4,719,538 | 1/1988 | Cox ........................................ 361/283 |
| 4,736,191 | 4/1988 | Matzke et al. ......................... 340/365 |
| 4,755,634 | 7/1988 | Pepper, Jr. ............................. 178/18 |
| 4,762,006 | 8/1988 | Asakawa et al. . |
| 5,010,773 | 4/1991 | Lorenz et al. . |
| 5,184,120 | 2/1993 | Schultz .................................. 340/870.38 |
| 5,231,386 | 7/1993 | Brandenburg et al. ................ 340/709 |
| 5,248,007 | 9/1993 | Watkins et al. ........................ 180/9.32 |
| 5,451,852 | 9/1995 | Gusakov ................................ 318/611 |

*Primary Examiner*—Bentsu Ro
*Attorney, Agent, or Firm*—Townsend and Townsend and Crew LLP

[57] ABSTRACT

An apparatus and method that allows a user to exert a force to control a motive machine. The exerted force is transferred by a force transferring means to force sensors which detect the amount and direction in which the force is exerted. The force sensors convert the applied force into an electrical signal which is used to control the motive features of a machine.

24 Claims, 7 Drawing Sheets

FORCE ACTUATED MACHINE CONTROLLER

BACKGROUND OF THE INVENTION

The present invention relates to an apparatus and method for controlling motive machines and their attendant features. More specifically, the present invention relates to an apparatus and method for controlling motive machines through the use of force rather than displacement.

The primary objective of any human interface to a machine is to allow a person to interact with the machine in the most natural and convenient way possible while allowing for precise control of all the machine's functions. Except for work done in the field of virtual reality, current interfaces between man and machine have not been drastically changed over the last several decades. The current technologies for controlling motive machines are all centered on the use of displacement is the primary means of control.

Typically, small displacement in an interface to control a machine translates to low speed, low power, slow rate of turn, low lift, etc. for the controlled machine. While a large displacement of the interface translates to high speed, quick rate of turn, high lift power, etc. For example, to control the speed of an automobile an accelerator pedal is used. To drive the car slowly, the pedal is depressed a short distance towards the floorboard of the car. To drive the car faster, the pedal is depressed further (closer towards the floorboard of the car). The factor that controls the speed of the car is the amount of displacement of the accelerator pedal towards the floor of the car.

The problem with current technologies is that the use of displacement to control the movement of an object is fundamentally unnatural to humans. The general manner in which a person moves an object is to apply force in the direction of the desired movement. For example, if a man wishes to lift a large rock, he grasps the rock with his hands and lifts or pulls upwards. The harder he pulls, the higher the rock is lifted. While he is lifting the rock, he feels pressure exerted on his hands and fingers—the more pressure his hands and fingers feel, the more force they are exerting to lift the rock.

For another example, if a woman wants to move a shopping cart, she places one hand on either end of the cart's bar handle. If she pulls with both hands, the cart moves towards her. If she pushes with both hands, the cart moves away from her. The amount of force she exerts in pulling or pushing the cart controls the speed in which the cart is moved. She can also control the direction in which the cart is pushed or pulled by varying the force exerted between her two hands.

The forces exerted by a person to control an object in a natural manner are multi-axial and/or multidimensional, and the displacement that occurs to an object is a result of the intended movement brought on by the application of an exerted force—displacement is the effect, not the cause of the intended movement.

Some devices that convert an applied force into electrical signals proportional to the applied force are known as evidenced by U.S. Pat. No. 4,495,219 issued to Sharp et al. However, the Sharp patent does not teach nor even suggest the benefits of and the natural manner in which a force actuated controller can be used to control motive devices. Additionally, the manner in which Sharp converts force to electrical signals is imprecise, subject to malfunction from wear-and-tear, and expensive to manufacture within the strict tolerance limits necessary to ensure proper operation.

Essentially, Sharp teaches two resistive layers with a spacer layer having a hole cut out. An elastomeric actuator positioned above the first resistive layer is pressed against the resistive layer which is then pressed against the second resistive layer when a force is applied to it. When a force is applied to the actuator, a connection between an area of the first resistive layer and the second resistive layer is made. The surface area covered by the connection is directly proportional to the force applied because the elastomeric properties of the actuator allow it to become deformed relative to the applied force.

One area in particular in which force can be used more naturally than displacement to control a motive object is the propulsion of a wheelchair. Without any sort of assistance, propelling a wheelchair can be an exhausting experience for anyone, regardless of their physical condition. Accordingly, many wheelchairs have small electric motors attached that allow the wheelchair to be propelled in response to the movement of a joystick or similar device.

In addition to the unnatural aspects that are a part of controlling the speed and direction a wheelchair moves with a joystick, somewhere between 5–10% of all wheelchair users lack the manual control and dexterity to accurately control and propel the wheel chair with a joystick. Some of the individuals in this population group suffer from diseases such as muscular dystrophy or partial upper body paralysis. For these individuals, precisely controlling the displacement and direction of the joystick is extremely difficult making it more difficult than usual for them to travel at the speed and in the direction they intend. Additionally, many of these same individuals are subject to muscle spasms, twitches, or similar ailments that further complicate the difficulties involved in using a joystick.

SUMMARY OF THE INVENTION

The present invention provides an apparatus and method for controlling motive machines using force rather than displacement as the means for control. The method and apparatus taught by the present invention does not include moving parts, and therefore is less subject to wear-and-tear than prior art apparatuses which focus on displacement as a means for control. The apparatus of the present invention also allows individuals who have a difficult time using and operating a joystick or other displacement based interface a method for precisely controlling the motive features of a machine.

One embodiment of the present includes force sensors for detecting an applied force and associated electronic circuitry that converts the applied force to signals that can be used to control motive features of a machine.

A second embodiment of the present invention includes a half-spherical shaped body on which a person places his/her hand. The user can apply a force to the half-sphere by pushing or pulling on it, and the applied force is transferred through the body of the half-sphere to force sensors which detect the amount and direction in which the force is exerted. The force sensors convert the applied force to electrical signals which are used to control the motive features of a machine.

A third embodiment includes an assembly member that is adapted to connect an extension piece such as a joystick or chin cup. The user applies a force through the extension piece which transfers the applied force to the assembly member. The assembly member has cavities situated around its perimeter in which ball bearings and force sensors are situated at an angle of approximately 45°. The applied force is further transferred from the assembly member through the ball bearings to the force sensors and is then used to control the motive features of a machine.

A fourth embodiment of the present invention includes multiple axis of control. Two axis of control are provided by force sensors that detect force in a manner similar to either of the previous two embodiments mentioned, and a third and even additional axis of control are available from force sensors that are positioned underneath the user's fingers and or other surfaces of physical interfaces to the user.

The features and advantages of a force actuated controller according to these and other embodiments of the present invention will be more clearly understood from the following description taken in conjunction with the accompanying drawings.

DESCRIPTION OF THE PREFERRED EMBODIMENTS

Figure 1:
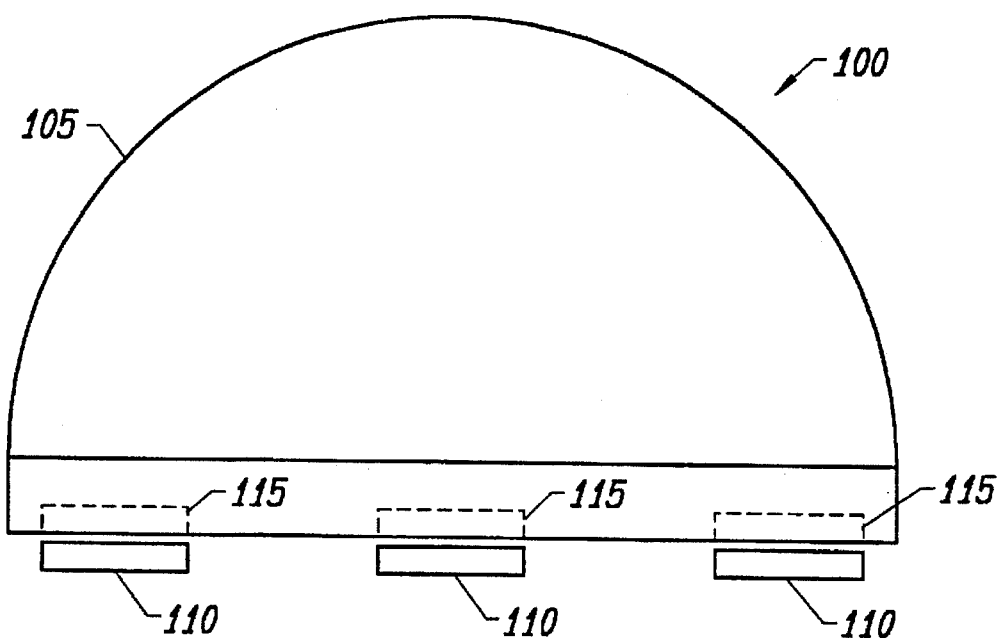
FIG. 1 is a side elevational view of a force actuated controller according to one embodiment of the present invention.

FIG. 1 is a side elevational view of a force actuator 100 according to one embodiment of the present invention. Force actuator 100 includes a half-sphere top 105 for a person to place his/her hand upon and to which the person exerts a force intended to control motive features of a machine, pressure sensors 110, and elastomeric rubber actuators 115 for distributing the exerted force evenly over pressure sensors 110.

In operation, force actuated controller 100 is coupled to a motive machine such as a wheel chair. An operator of the motive machine exerts a force (commonly through the palm of the user's hand) on half-sphere 105. The exerted force is transferred from half-sphere 105 to elastomeric rubber actuators 115. Elastomeric rubber actuators 115 work to distribute the exerted force over the surface of pressure sensors 110, which detect the amount and direction of the exerted force.

Figure 2A:
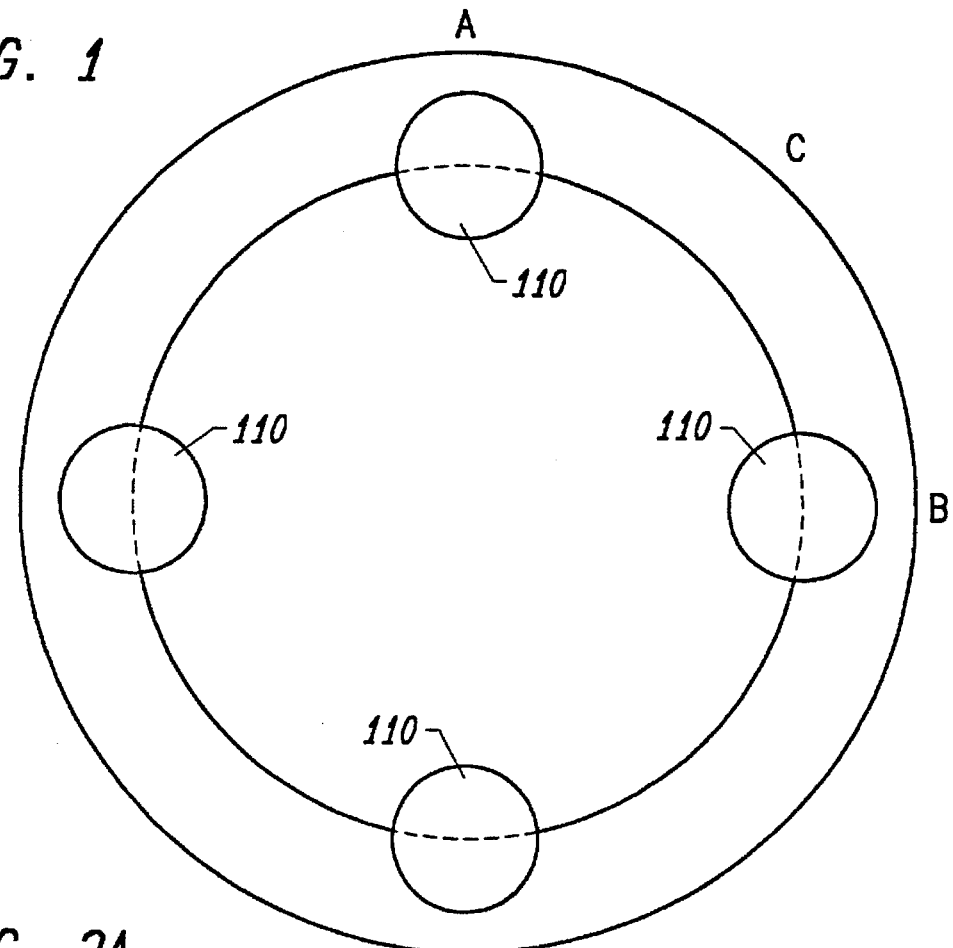
FIG. 2A is a diagram illustrating one arrangement of pressure sensors for the embodiment of the force actuator shown in FIG. 1.

FIG. 2A is a diagram illustrating one arrangement of pressure sensors 110 for the embodiment of the force actuator shown in FIG. 1. Pressure sensors 110 include four individual pressure sensors evenly spaced around the circumference of a circle. Each individual pressure sensor is a force sensitive resistor, but those of skill in the art will recognize that other pressure sensing devices such as strain gauges or sensors made from piezoelectric material can be used.

In detecting an applied force, pressure sensors 110 combine to detect both the translational velocity (Y-axis) and the rotational velocity (X-axis) of the force. For example, when the user presses on force actuator 100 near point A, pressure sensors 110 translate the magnitude of the force into a forward translational (Y-axis) velocity without any rotational component, thus propelling the motive device forward. However, if pressure is applied near point B, pressure sensors 110 translate the magnitude of the force into a right rotational velocity (X-axis) without any translational component, thus turning the motive machine to the right. A force applied in the direction of point C will be converted into a signal having both translational and rotational (X- and Y-axis) components. As would easily be understood by those skilled in the art, pressure sensors 110 can combine to detect magnitude and direction of an applied force rather than translational and rotational velocities.

Figure 2B:
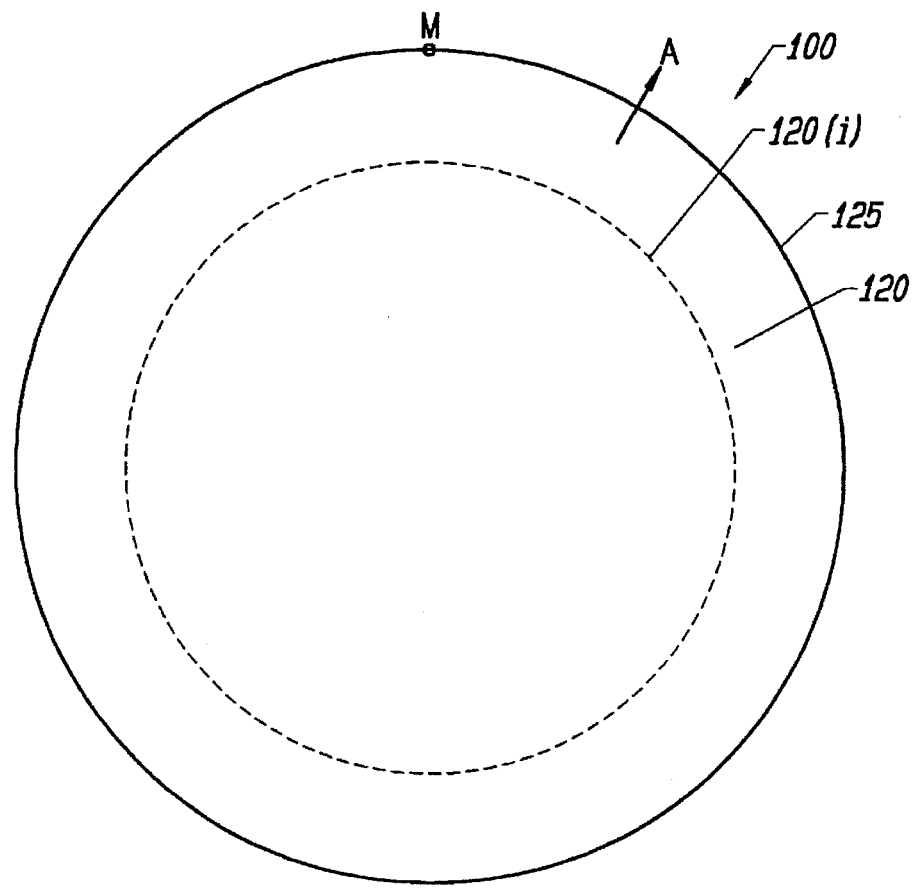
FIG. 2B is a diagram illustrating a second arrangement of pressure sensors for the embodiment of the force actuator shown in FIG. 1.

FIG. 2B is a diagram illustrating a second arrangement of pressure sensors 110 for the embodiment of the force actuator shown in FIG. 1. In this embodiment, pressure sensors 110 include a plurality of individual sensors shown collectively as a sensor ring 120. Ring 120 fits within an outer fixed concentric surface 125 of half-sphere 100. When a force is exerted in direction A, an individual sensor 120($i$) has more pressure exerted on it than the other sensors. This establishes a direction relative to point M and the amount of force establishes a magnitude—thus defining a vector. These two signal components can then be combined and utilized to the control direction and speed of a motive device.

The embodiment shown in FIG. 2B can also be implemented with two or more separate concentric full ring sensors rather than individual discrete sensors. Such ring sensors are well known to those of skill in the art and, for example, are manufactured by companies such as Interlink Electronics of California. If full ring sensors are used, a translational component of an applied force is detected by one ring sensor, and a rotational component of the applied force is detected by a second, concentric ring sensor. The rotational component is determined by detecting where along the second ring sensor an applied force is directed in relation to a known point, such as point M.

Figure 3:
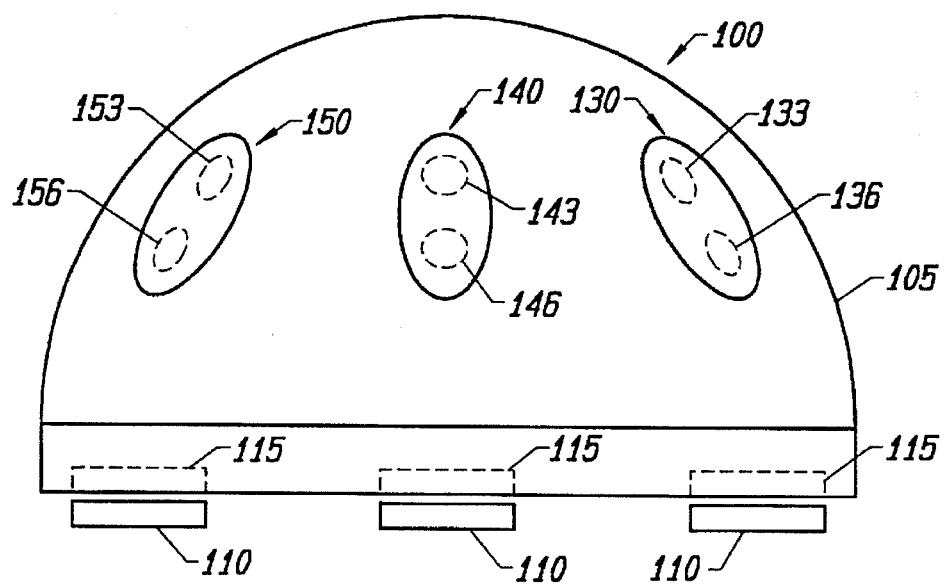
FIG. 3 is a diagram illustrating one embodiment of the force actuated controller shown in FIG. 1 with additional axis of control.

The force actuated controllers shown in FIGS. 1–3 all incorporate two axis of control: a Y-axis for sensing translational velocity and an X-axis for sensing rotational velocity. It is possible, however, to implement force actuated controller 100 with three, four, or even more axis of control. FIG. 3 is a diagram illustrating an embodiment of force actuated controller 100 with five axis of control. For convenience, the same reference numerals used in FIG. 1 are used in FIG. 3 to refer to like elements.

In addition to the elements discussed with respect to FIG. 1, force actuated controller 100 shown in FIG. 3 includes finger buttons 130, 140, and 150 and pressure sensors 133, 136, 143, 146, 153, and 156. Finger buttons 130, 140, and 150 are positioned along the surface of half-sphere 105 such that when a user's palm rests on half-sphere 105, his index finger (assuming use of the right hand) is on force sensor 140, his middle finger is on force sensor 145, and his ring finger is on force sensor 150. Beneath finger button 130 are two pressure sensors 133 and 136; beneath finger button 140 are two pressure sensors 143 and 146; and beneath finger button 150 are two pressure sensors 153 and 156.

A user propels and controls the direction of a motive machine (X- and Y-axis control) by applying a force with his palm on half-sphere 105 in the same manner as described with respect to FIG. 1. Each of finger buttons 130, 140, and 150, however, provide an additional axis of control. Since each the operation of each finger button is identical, only the operation of finger button 130 is described in detail.

Finger button 130 is an oblong, dome-shaped device that provides a single axis of control that, for example, can be used to control the reclining angle of a person's seat in a wheelchair. Exerting a force on or near the bottom of finger button 130 causes the seat to recline further (defined here as sending a positive vector to the seat's reclining motor), while exerting a force on or near the top of finger button 30 causes the seat to tilt towards an upright position (sending a negative vector to the seat's motor).

Of course, finger button 130 could be implemented in a number of different manners and could even provide for two or three axis of control by itself. Two axis could be provided if there were four sensors situated beneath finger button 130 in a manner similar to four pressure sensors 110. The third axis could be provided by allowing an up/down movement of finger button 130 in addition to forward/backward and left/right movements. Obviously, the inclusion of finger buttons allows for a virtually unlimited number of axis of control to control a variety of functions. Additionally, further axis of control can be gained by combining pressure sensors 110 of FIG. 2A with ring sensor 120 of FIG. 2B.

Figure 4:
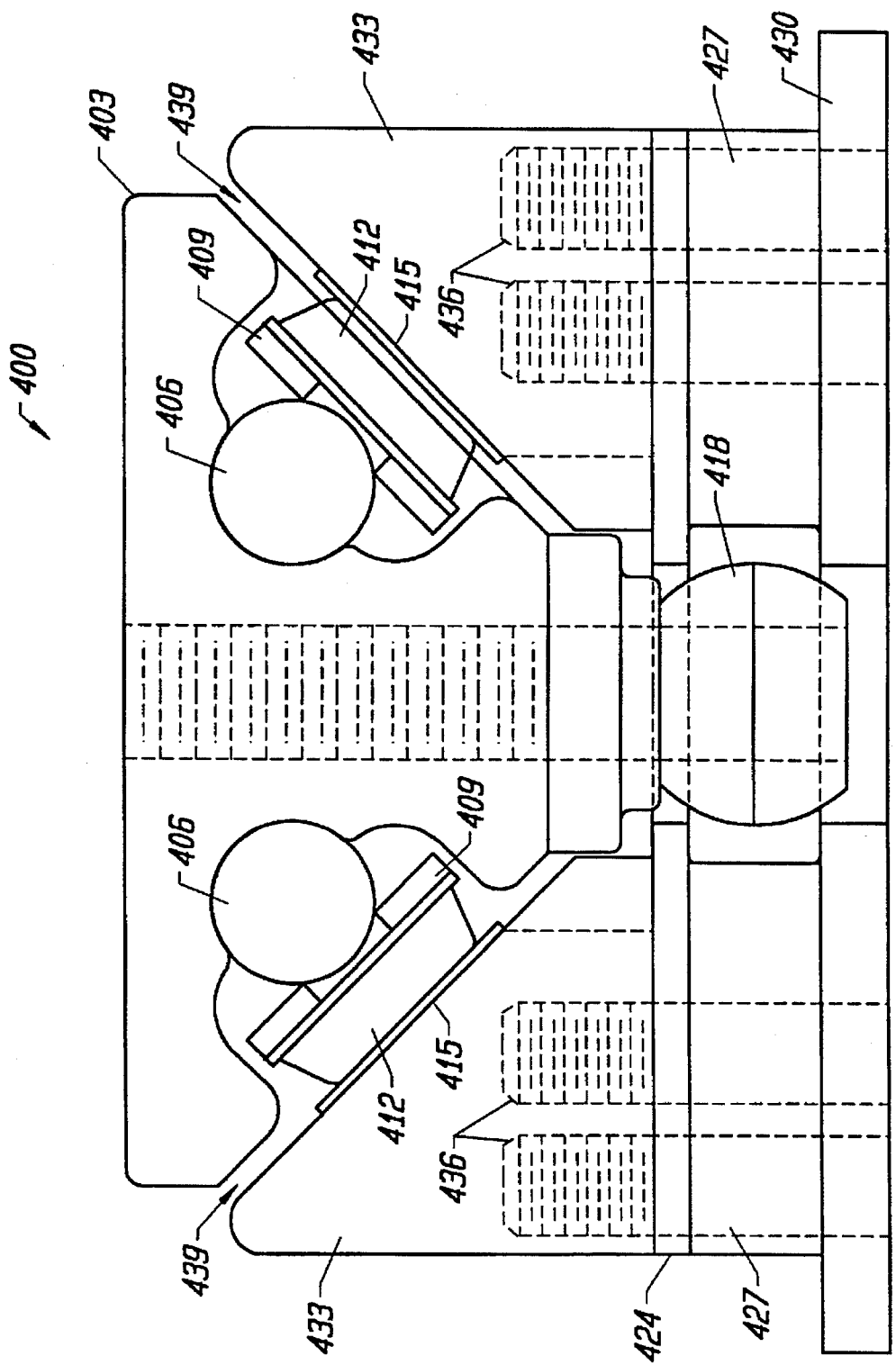
FIG. 4 is a side cross-sectional view of a force actuated controller according to an additional embodiment of the present invention.
Figure 5A:
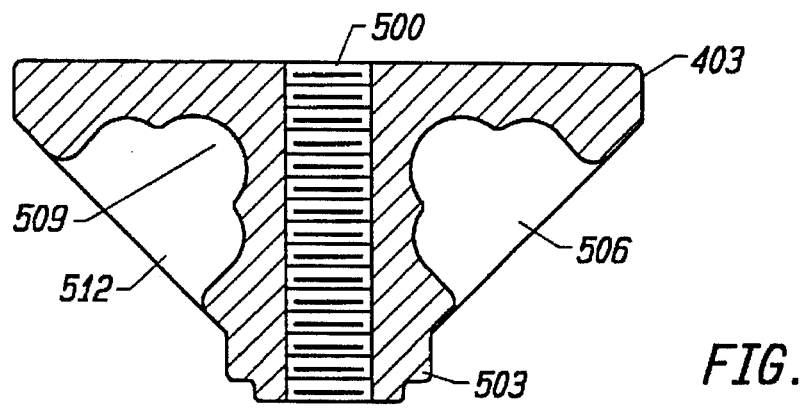
FIG. 5A is a side cross-sectional view of an assembly member used in the force actuated controller shown in FIG. 4.
Figure 5C:
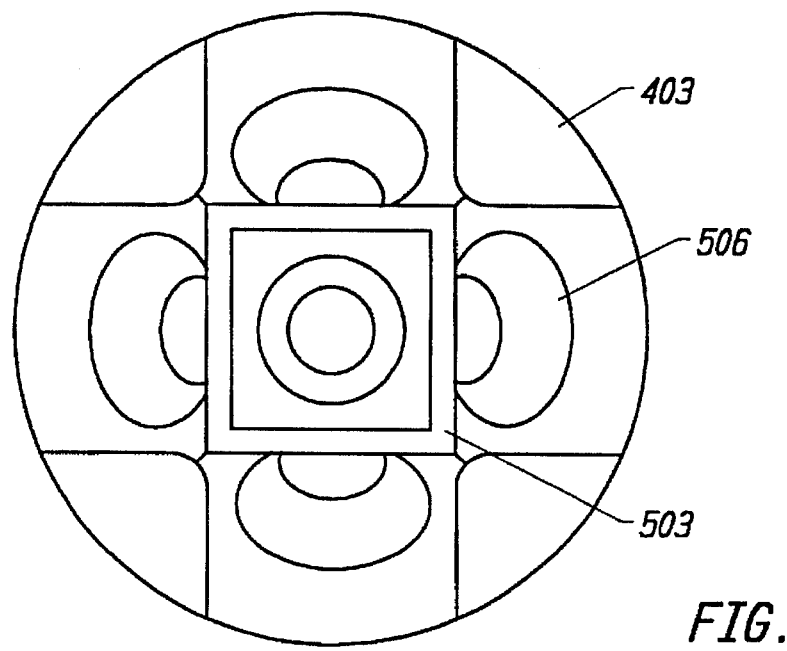
FIG. 5C is a bottom plan view of the assembly member shown in FIG. 5A.
Figure 5B:
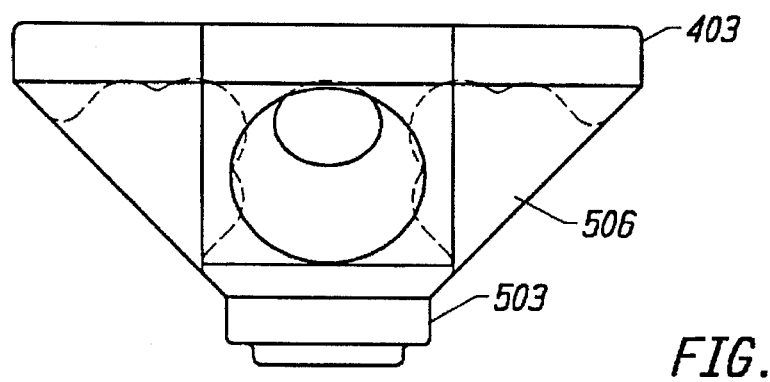
FIG. 5B is a side elevational view of the assembly member shown in FIG. 5A.
Figure 6:
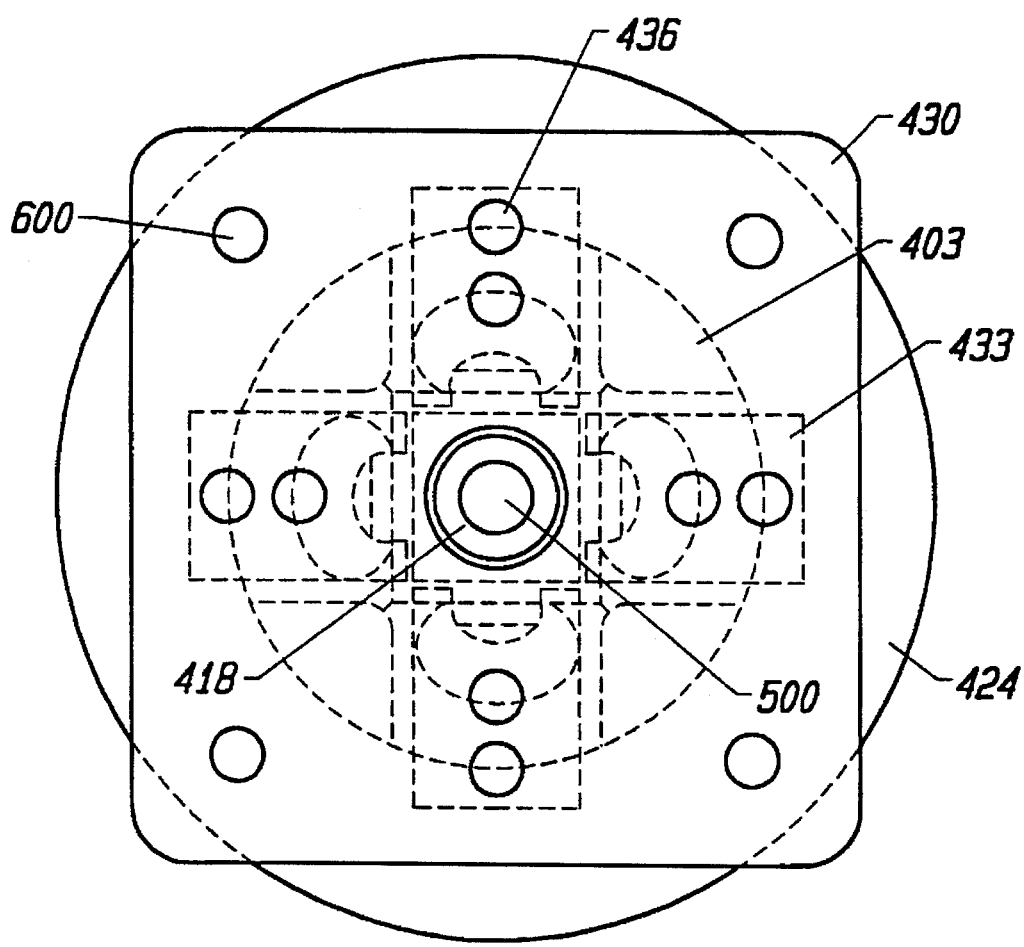
FIG. 6 is a bottom view showing spatial relationships of the various structural members of the force actuated controller shown in FIG. 4.

FIGS. 4-6 show various aspects of a force actuated controller 400 according to a second embodiment of the present invention. FIG. 4 is a side cross-sectional view of force actuated controller 400; FIG. 5A is a side cross-sectional view of an assembly member used in the force actuated controller shown in FIG. 4; FIG. 5B is a side elevational view of the assembly member shown in FIG. 5A; FIG. 5C is a bottom plan view of the assembly member shown in FIG. 5A; and FIG. 6 is a bottom view showing spatial relationships of the various structural members of the force actuated controller shown in FIG. 4. Force actuator 400 includes an assembly member 403, spherical bearings 406, washers 409, elastomeric bumpers 412, pressure sensors 415, a spherical bearing 418, a plate 424, circular plate 427, a base plate 430, and side supports 433.

Base plate 430, circular plate 427, plate 424, and side supports 433 are separate pieces attached to each other with screws (not shown) screwed into bores 436. Base plate 430 includes holes 600 that allow the force actuated controller 400 to be attached to a motive device with screws, bolts, or similar devices. Circular plate 427 is situated on top of base plate 430, and four separate side supports 433 are positioned at 90 degree angles around the perimeter of base plate 430.

On each side support 433 is an individual pressure sensor 415, and individual elastomeric bumper 412, an individual washer 409, and an individual ball bearing 406 arranged as a single force transfer unit. Pressure sensor 415 is directly attached to side support 433, and elastomeric bumper 412 is positioned on top of pressure sensor 415. Washer 409 is directly on top of elastomeric bumper 412 and ball bearing 409 is centered within the hole of washer 409 so that it contacts elastomeric bumper 412.

Assembly member 403 is positioned at the center of force actuated controller 400. As shown in FIGS. 5A, 5B, and 5C which are differing views of assembly member 403, assembly member 403 has a threaded bore 500 running through its center in a longitudinal direction and a square bottom section 503. Assembly member 403 also has cavity sections 506 which have dome-shaped top portions 509 and cylindrical-shaped bottom portions 512.

Each cavity section 506 is large enough so that a force transfer unit (a single ball bearing 406, a single washer 409, and a single elastomeric bumper 412) and a single pressure sensor 415 fits within the cavity. Additionally, a portion of ball bearing 406 fits within in dome-shaped top portion 509 of cavity section 506 while the rest of the force transfer unit and its corresponding pressure sensor 415 fits within cylindrical-shaped portion 512 of cavity section 506.

Bottom section 503 fits closely within the bottom portions of the four side supports 433 and prevents assembly member 403 from rotating. Bore 500 allows a bolt or screw to attach spherical bearing 418, which also has a bore running through it, to the bottom of assembly member 403. Spherical bearing 418 fits tightly within base plate 430, circular plate 427, and plate 424 thus preventing up/down movement of assembly member 403. In another embodiment, allowing up/down movement can provide for a Z-axis of control in addition to control along the X- and Y-axis.

The distance between the sidewall of assembly member 403 and side supports 433 labelled as gap 439 is of critical importance. In the preferred embodiment, gap 439 is 0.028 inches wide. This distance allows just the right amount of displacement between assembly member 403 and side supports 433 to prevent excessive force from being applied and still allow elastomeric bumper 412 to compress under pressure.

Bore 500 also allows assembly member 403 to be connected to any of a number of different pieces that are designed specifically for various means of control. For example, in one embodiment of the present invention, a half-sphere is positioned on top of and securely attached to assembly member 403 with a bolt screwed through bore 500. The half-sphere is similar in function to half-sphere 105 described in conjunction with FIG. 1 and allows a user to control a motive machine with his or her arm. Another embodiment of the present invention, however, provides for a special chin cup that attaches to assembly member 403 through bore 500. The chin cup allows a user who may be paralyzed from the neck down to control movement of the wheel chair with his or her neck. As is obvious to those skilled in the art, there are many different devices that may be attached to assembly member 403 that allow the motive features of a machine to be controlled by various body parts such as a foot, a tongue, or a partially amputated limb.

In operation, depending on the application force actuator 400 is used, an appropriate attachment is connected to assembly member 403 with a screw or similar connector through threaded bore 500 as described in detail above. When a user applies a force to assembly member 403 through an attachment, one or more of ball bearings 406 is pressed against its corresponding elastomeric bumper 412. The force is then transferred from elastomeric bumper 412 to the appropriate pressure sensor 415 in a manner identical to the manner in which force is distributed from elastomeric rubber actuators 115 to pressure sensors 110, and is therefore, not described in detail here.

The inner wall of side supports 433 is angled to facilitate this force transfer from assembly member 403 to pressure sensors 415. The angle gives a more precise feel to the system allowing both small and large applied forces to be accurately measured by pressure sensors 415. Preferably side supports 433 are at an angle of between 15 and 75 degrees, and most preferably at an angle of about 45 degrees which provides optimum sensing of both horizontally and vertically applied forces.

Figure 7:
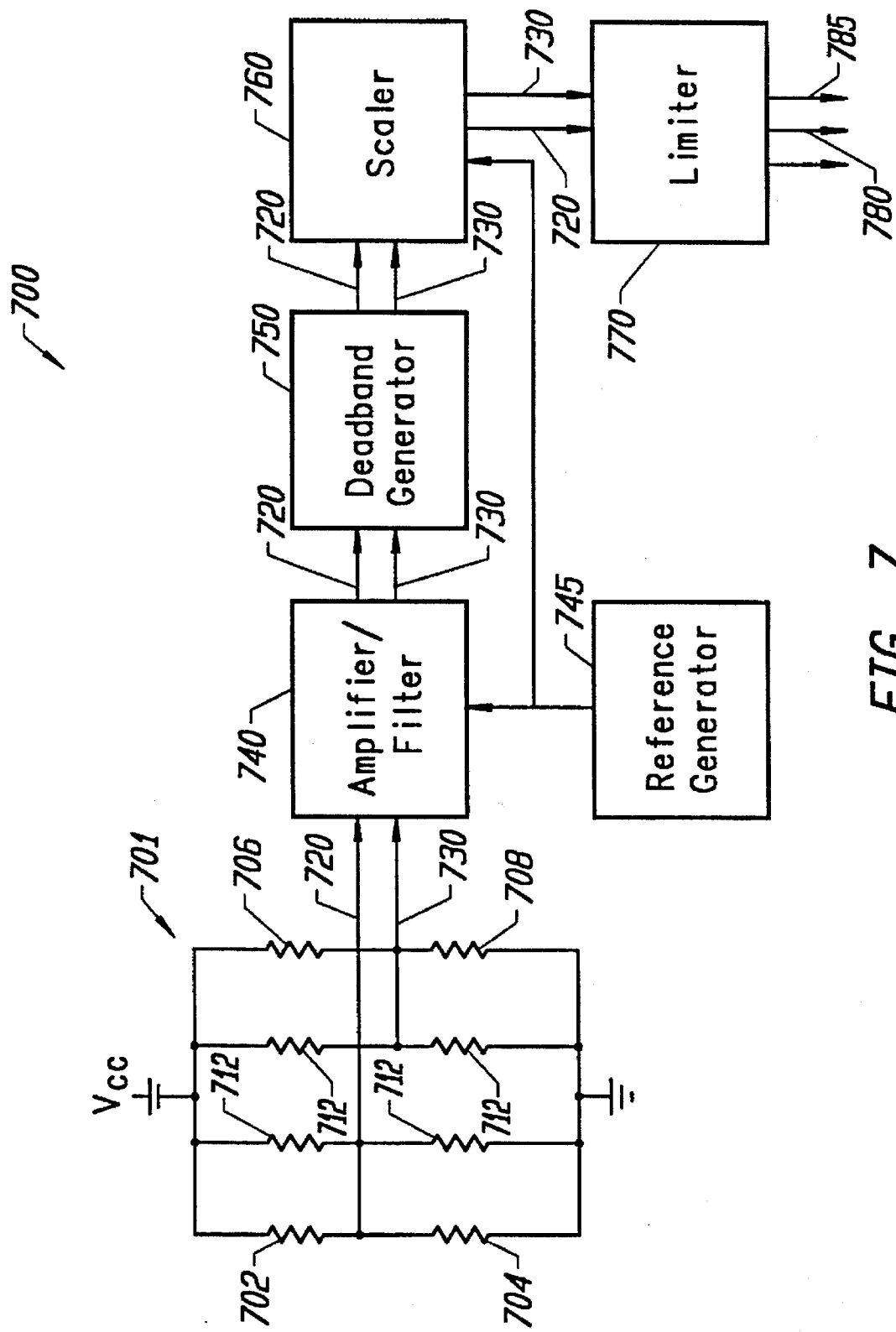
FIG. 7 is a circuit diagram of one embodiment of the electronic circuitry associated with the force actuated controller of FIG. 4.

FIG. 7 is a circuit diagram of one embodiment of the electronic circuitry 700 associated with the force actuated controller of FIG. 4. In FIG. 7, a force sensitive resistor circuit 701 includes force sensitive resistors 702, 704, 706, and 708 which correspond to force sensitive resistors 110 of FIGS. 1 and 2 or pressure sensors 415 of FIG. 4. As previously described, each force sensitive resistor produces a voltage signal proportional to the applied force. Thus, the four resistors 702 to 708 are arranged in pairs of voltage dividers that act to produce two signals: a translational velocity (y axis) signal and a rotational velocity (x axis) signal. Force sensitive resistors 702 and 704 are disposed on opposing sides of force actuator 100 or 400 and detect the forward and reverse translational velocity components of applied force. Force sensitive resistors 706 and 708 detect the left and right rotational velocity components of the applied force. Also included in resistor circuit 701 are resistors 712, which are not force sensitive resistors, but instead provide a minimum resistance value to the circuit when little or no force is applied.

The translational component of the applied force is taken from force sensitive resistors 702 and 704 by output 720 and amplified and filtered by amplifier/filter 740. Similarly, the rotational component of the applied force is taken from force sensitive resistors 706 and 708 by output 730 and amplified and filtered by amplifier/filter 740. Amplification is performed with respect to a reference signal generated from reference signal generator 745. The filtering of amplifier/filter 740 removes random noise and harmonic noise produced by, for example, motor vibrations from the signal.

Amplifier/filter 740 can also be employed to help persons suffering from uncontrollable muscle spasms better control motive devices. Such muscle spasms typically produce noise signals from force sensitive resistors 701 that are somewhat harmonic in nature. Thus, by adjusting the frequency range of noise filtered out of signal lines 720 and 730, the unwanted effects of the spasms on a motive machine can be controlled or even completely eliminated. Frequency and amplification adjustment can be made to amplifier/filter 740 with potentiometers or other devices as is well known to those skilled in the art.

The output of amplifier/filter 740 is transmitted to deadband generator 750 which produces a deadband signal area. The deadband signal area ensures that very small signal changes on signal lines 720 and 730 do not produce corresponding changes in angular velocity signal 780 or translational velocity signal 785 which are output from circuitry 700 to control a motive device. Deadband generator 750 consists of a combination of diodes, resistors and amplifiers and can be constructed in a number of difference embodiments as would be well understood by those of skill in the art. In one specific embodiment, the voltage drop across diodes on each signal line 720 and 730 is used to control the deadband signal area. In another embodiment, the deadband signal area is user adjustable through the use of a potentiometer.

Scaler 760 inputs the output of deadband generator 750 and reference signal generator 745 and scales the signals on lines 720 and 730 so that the translational and rotational velocity signal strengths are comfortably responsive to the applied force level. That is, scaler 760 ensures that the translational and rotational controls generated by circuitry 700 feel comfortable and natural to a user operating the input device. For example, if a large force is initially applied to propel a wheel chair forward, scaler 760 ensures a smooth constant acceleration curve so that the wheel chair does not move forward with a jerky motion. The sensitivity of scaler 760 can be adjusted by a potentiometer or similar device.

The output of scaler 760 is input to limiter 770. Limiter 770 limits the maximum signal strength of angular velocity signal 780 and translational velocity signal 785. Thus, along with the physical limitations of a particular motive machine being controlled, limiter 770 sets a maximum speed level and turning radius for the controlled motive device. These maximum levels can be adjusted with a potentiometer or similar adjustment mechanism.

An additional embodiment of circuitry 700 can include a microcontroller or microprocessor to perform the functionality of deadband generator 750, scaler 760 and limiter 770. The microcontroller can also be programmed with artificial intelligence routines to filter out vibration noise or muscle spasm noise depending on an individual user's needs.

As discussed above, the various embodiment of force actuated controller described herein are particularly, useful in controlling the propulsion of a motive machine such as a wheel chair or automobile. In controlling a motive device with front and back sets of wheels that are all independently driven, circuitry 700 of FIG. 7 can be set to adjust the vehicle's apparent pivot point for turns. Having the apparent pivot point at the center of a vehicle provides for a more natural turning sensation and allows for more precise control of the vehicle.

To adjust the apparent pivot point, when the rotational velocity component of the applied force is translated to a turning signal for the motive device (a wheel chair for example), the translational velocity of the wheel chair can be slightly decreased or increased so that the apparent pivot point of a turn is at the center of the wheel chair rather than at the rear wheels. The decrease in translational velocity is only applied to the vehicle during the actual turn. Once the turn is completed, the translational velocity is returned to its normal value.

A simple manner to effect the change in the apparent pivot point of a turn is to subtract a constant from the translational velocity signal regardless of a vehicle's velocity and a specific turn's radius. This method cannot ensure that the apparent pivot point will always be directly under the center of the vehicle, but it can ensure that the pivot point will shift from the front wheels to a point closer to the center. Additionally, a microprocessor can be programmed to determine the exact decrease or increase in translational velocity depending on the vehicle's speed and the desired turn radius that is needed to move the apparent pivot point to the center of the vehicle.

Figure 8A:
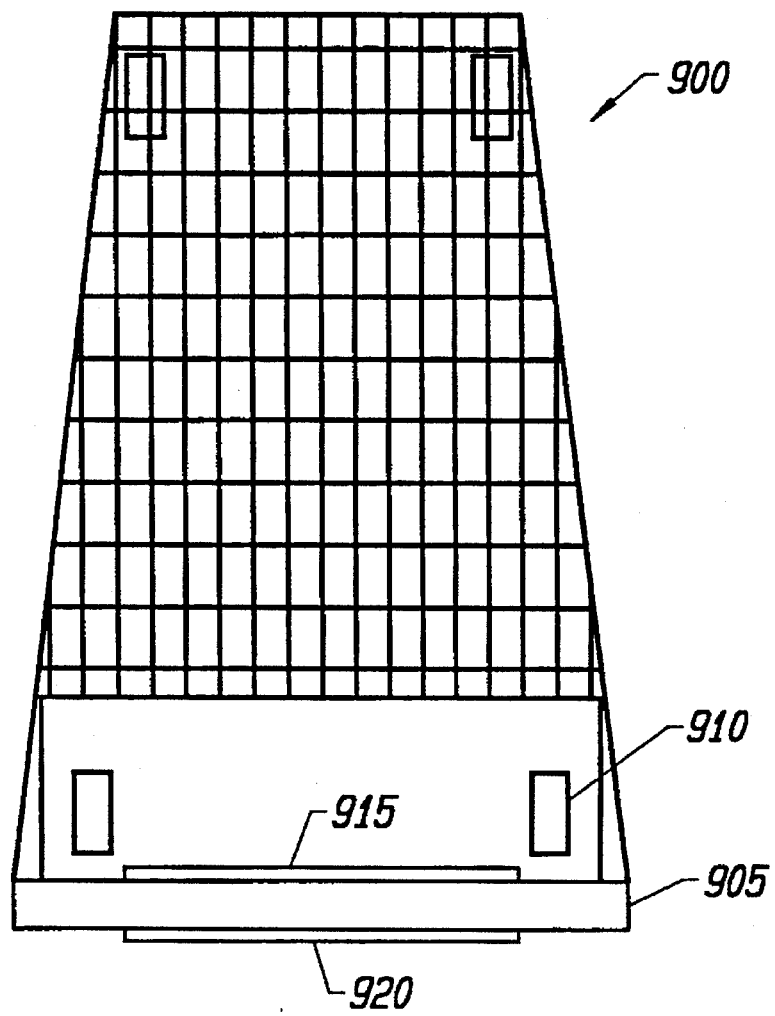
FIG. 8A is a top plan view of one embodiment of a force actuated controller used to control the motive features of a shopping cart.

FIG. 8A is a top plan view of a force actuated controller used to control the motive features of a shopping cart 900. Shopping cart 900 includes a handle bar 905, wheels 910, a first pressure sensor 915, a second pressure sensor 920, and a small electric motor (not shown). First pressure sensor 915 is positioned on the rear side of handle bar 905, and second pressure sensor 920 is positioned on the front side. Both pressure sensors can be covered with a durable elastomeric material.

When a shopper presses handle bar 905 away from himself or herself, the exerted force is sensed by pressure sensor 920 and an appropriate signal is sent to the motor to turn wheels 910 propelling the cart forward. Similarly, when a shopper pulls handle bar 905 towards himself or herself, the exerted force is sensed by pressure sensor 915 and an appropriate signal is sent to the motor to turn wheels 910 propelling the cart backwards. The force sensors control the motor so that once the cart is initially moving, less force is required to keep it moving at a constant rate of speed and so that there is always at least a slight negative force against the shopper's hands for a feeling of precise control.

Figure 8B:
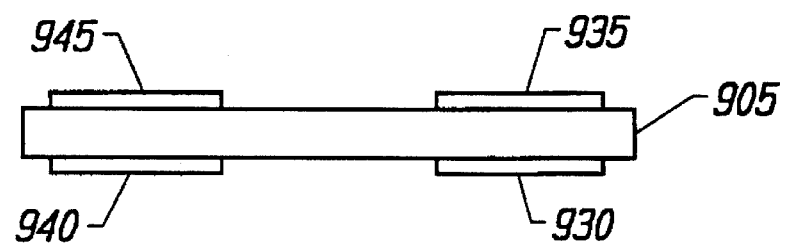
FIG. 8B is a top plan view of a second embodiment of a force actuated controller used to control the motive features of a shopping cart.

Alternatively, pressure sensors can be positioned on handle bar 905 as shown in FIG. 8B. In FIG. 8B, a pair of pressure sensors are included for both hand of a shopper. A shopper pushing and pulling with his right hand exerts a force on sensors 930 and 935, respectively, while pushing and pulling with his left hand exerts a force on sensors 940 and 945, respectively.

Sets of sensors 930, 935 and 940, 945 control the right and left wheels, respectfully. When an force is applied by the shopper's hands, cart 900 is propelled directly forward or directly backward. Steering can be accomplished by sensing the difference of applied force between the shoppers two hands. For example, applying more force with the right hand than the left hand will turn the cart towards the left. The rate at which the cart turns is dependent on the magnitude of the force difference.

The force actuated controller shown in FIGS. 9A and 9B is also particularly useful in propelling any device with a handle bar similar to a shopping cart. In particular, this force actuated controller is useful in propelling heavy devices such as medical gurneys or large lawnmowers.

Having fully described one embodiment of the present invention, many other equivalent or alternative methods of implementing the force actuated controller of the present invention will be apparent to those skilled in the art. For example, the present invention is not to be limited to the control of wheel chairs, shopping carts, or gurneys. Persons skilled in the art will recognize that the principles described in this application can be used to control motive and other features of almost any device such as a car, boat, radio-controlled airplane, a robotic arm, or any motive device that could be controlled with a joystick. Also, rather than employing half-sphere top 105 as the user control interface, a molded piece that conforms to a user's hand, elbow, foot, or other body part can be employed. These equivalents and alternatives are intended to be included within the scope of the present invention.

What is claimed is:

1. An apparatus for controlling a direction and a speed in which a motive device propels a machine, said apparatus comprising:
   (a) a plurality of force sensors for detecting a translational component of an applied force and for detecting a rotational component of said applied force;
   (b) force transfer means formed of a rigid single moving part having a base surface coupled to said plurality of force sensors, for receiving said applied force and transferring said applied force to said plurality of force sensors; and
   (c) a motive control circuit, coupled to said plurality of force sensors, for controlling the direction and the speed at which the motive device propels the machine in response to said detected translational component of said applied force and said detected rotational component of said applied force.

2. The force responsive apparatus of claim 1 wherein said force transfer means comprises a substantially half-spherical body.

3. An apparatus for controlling a direction and a speed in which a motive device propels a machine, said apparatus comprising:
   (a) a plurality of force sensors for detecting a translational component of an applied force and for detecting a rotational component of said applied force;
   (b) force transfer means, formed from a rigid substantially half spherical body coupled to said plurality of force sensors, for receiving said applied force and transferring said applied force to said plurality of force sensors; and
   (c) a motive control circuit, coupled to said plurality of force sensors, for controlling the direction and the speed at which the motive device propels the machine in response to said detected translational component of said applied force and said detected rotational component of said applied force; wherein said plurality of force sensors are evenly spaced around a perimeter of a ring concentric with the base of said substantially half spherical body.

4. An apparatus for controlling a direction and a speed in which a motive device propels a machine, said apparatus comprising:
   (a) a plurality of force sensors for detecting a translational component of an applied force and for detecting a rotational component of said applied force;
   (b) force transfer means, formed from a substantially half spherical body coupled to said plurality of force sensors, for receiving said applied force and transferring said applied force to said plurality of force sensors, wherein said force transfer means further comprises a plurality of elastomeric bumpers, one for each of said plurality of force sensors, and wherein each of said elastomeric bumpers is positioned above its corresponding force sensor so that said applied force is transferred from said bumpers to said force sensors; and
   (c) a motive control circuit, coupled to said plurality of force sensors, for controlling the direction and the speed at which the motive device propels the machine in response to said detected translational component of said applied force and said detected rotational component of said applied force; wherein said plurality of force sensors are evenly spaced around a perimeter of a ring concentric with the base of substantially half spherical body.

5. An apparatus for controlling a direction and a speed in which a motive device propels a machine, said apparatus comprising:
   (a) a plurality of force sensors for detecting a translational component of an applied force and for detecting a rotational component of said applied force;
   (b) force transfer means formed of a single moving part having a base surface coupled to said plurality of force sensors, for receiving said applied force and transferring said applied force to said plurality of force sensors, wherein said force transfer means comprises:
   an assembly member for receiving said applied force;
   a support member for supporting said plurality of force sensors; and a plurality of elastomeric bumpers for transferring said applied force from said assembly member to said force sensors; and (c) a motive control circuit, coupled to said plurality of force sensors, for controlling the direction and the speed at which the motive device propels the machine in response to said detected translational component of said applied force and said detected rotational component of said applied force.

6. The force responsive apparatus of claim 5 wherein said plurality of force sensors are supported by said support member at an angle of between 15 and 75 degrees to vertical.

7. The force responsive apparatus of claim 5 wherein said plurality of force sensors are supported by said support member at an angle of about 45 degrees to vertical.

8. The force responsive apparatus of claim 5 wherein:
said assembly member includes a plurality of cavities;
said force transfer means further comprises a plurality of spherical bearings which contact said plurality of elastomeric bumpers; and
each of said cavities is adopted to hold a portion of said spherical bearings such that a force applied to said assembly member is transferred to said spherical bearings, then to said elastomeric bumpers, then to said force sensors.

9. The force responsive apparatus of claim 8 wherein said force transfer means further comprises a plurality of washers with each washer being disposed between one of said elastomeric bumpers and one of said spherical bearings.

10. The force responsive apparatus of claim 8 wherein said assembly member includes a longitudinal bore through its center.

11. The force responsive apparatus of claim 5 wherein each of said force sensors is a force sensitive resistor.

12. The apparatus of claim 5 wherein said assembly member is substantially conical-shaped.

13. The force responsive apparatus of claim 12 wherein said plurality of force sensors are supported by said support member at an angle of between 15 and 75 degrees to vertical.

14. The force responsive apparatus of claim 12 wherein said plurality of force sensors are supported by said support member at an angle of about 45 degrees to vertical.

15. The force responsive apparatus of claim 12 wherein:
said assembly member includes a plurality of cavities;
said force transfer means further comprises a plurality of spherical bearings which contact said plurality of elastomeric bumpers; and
each of said cavities is adopted to hold a portion of said spherical bearings such that a force applied to said assembly member is transferred to said spherical bearings, then to said elastomeric bumpers, then to said force sensors.

16. The force responsive apparatus of claim 15 wherein said force transfer means further comprises a plurality of washers with each washer being disposed between one of said elastomeric bumpers and one of said spherical bearings.

17. An apparatus for controlling a direction and a speed in which a motive device propels a machine, said apparatus comprising:

(a) a plurality of force sensors for detecting a translational component of an applied force and for detecting s rotational component of said applied force;

(b) force transfer means formed of a single moving part having a base surface coupled to said plurality of force sensors, for receiving said applied force and transferring said applied force to said plurality of force sensors;

wherein said plurality of force sensors comprises a first force sensitive ring resistor and a second force sensitive ring resistor; and (c) a motive control circuit, coupled to said plurality of force sensors, for controlling the direction and the speed at which the motive device propels the machine in response to said detected translational component of said applied force and said detected rotational component of said applied force.

18. An apparatus for controlling a direction and a speed in which a motive device propels a machine, said apparatus comprising:

(a) a plurality of force sensors for detecting a translational component of an applied force and for detecting a rotational component of said applied force;

(b) force transfer means formed of a single moving part having a base surface coupled to said plurality of force sensors, for receiving said applied force and transferring said applied force to said plurality of force sensors;

(c) a motive control circuit, coupled to said plurality of force sensors, for controlling the direction and the speed at which the motive device propels the machine in response to said detected translational component of said applied force and said detected rotational component of said applied force; said motive control circuit comprising:

a filter for filtering out noise signals produced by said force sensors wherein said motive control circuit further comprises:

a deadband generator for reducing the effect a relatively small applied force has on the control of the motive device.

19. The apparatus according to claim 18 wherein said motive control circuit further comprises:

a scaling circuit that determines the sensitivity of response of direction and speed control of the motive device in relation to the applied force level.

20. The apparatus according to claim 19 wherein said motive control circuit further comprises:

a limiting circuit that limits the maximum translational velocity signal used to control the motive device.

21. The apparatus according to claim 20 wherein said motive control circuit further comprises:

a limiting circuit that limits the maximum rotational velocity signal used to control the motive device.

22. An apparatus for controlling a direction and a speed in which a motive device propels a machine, said apparatus comprising:

(a) a plurality of force sensors for detecting a translational component of an applied force and for detecting a rotational component of said applied force;

(b) force transfer means formed of a single moving part having a base surface coupled to said plurality of force sensors, for receiving said applied force and transferring said applied force to said plurality of force sensors wherein said force transfer means comprises an assembly member for receiving said applied force from a user's hand, a support member for supporting said plurality of force sensors, and a plurality of bumpers for transferring said applied force from said assembly member to said force sensors;

(c) a motive control circuit, coupled to said plurality of force sensors, for controlling the direction and the speed at which the motive device propels the machine in response to said detected translational component of said applied force and said detected rotational component of said applied force; and (d) a second plurality of force sensors for detecting a second applied force used to control an additional feature of said motive device wherein said second plurality of force sensors are positioned upon said assembly member to allow an additional axis-of-control to be controlled by one of said user's fingers.

23. An apparatus for controlling a direction and a speed in which a motive device propels a wheelchair, said apparatus comprising:

(a) a plurality of force sensors for detecting first and second components of an applied force;

(b) a force transfer system formed from a single rigid moving part having a base surface coupled to said plurality of force sensors, for receiving said applied force and transferring said applied force to said plurality of force sensors; and (c) a motive control circuit, coupled to said plurality of force sensors, for controlling the direction and the speed at which the motive device propels the wheelchair in response to said detected first and second components of said applied force.

24. A method of controlling speed and direction of a motive device, said method comprising the steps of:

(a) applying a force to an assembly member coupled to said motive device, said assembly member formed of a single rigid moving part having a base surface;

(b) transferring said applied force from said assembly member to a plurality of force sensors with a force transfer system, said plurality of force sensors positioned proximate said base surface;

(c) detecting a translational component and rotational component of said applied force with said force sensors and associated circuitry;

(d) translating, with a motive control circuit, the detected translational and rotational components of said applied force into signals to control said motive device.

* * * * *